March 6, 1928. 1,661,873
B. BUXBAUM
JOINT FOR THE MEMBERS OF BAR STRUCTURES
Filed March 8, 1924
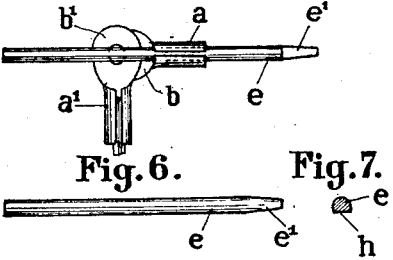

Patented Mar. 6, 1928.

1,661,873

UNITED STATES PATENT OFFICE.

BERTHOLD BUXBAUM, OF BERLIN-CHARLOTTENBURG, GERMANY.

JOINT FOR THE MEMBERS OF BAR STRUCTURES.

Application filed March 8, 1924, Serial No. 697,895, and in Germany March 13, 1923.

My invention relates to a joint, i. e. to a plurality of joint-members, by which the members of bar-structures can be connected with each other quickly and reliably in such a manner that the respective bars can also be disconnected quickly and conveniently. This joint is intended chiefly for provisional structures, such, for instance, as sheds, supports for awnings, and similar or other provisional structures as are often times rendered necessary for industrial and other purposes. The joint can, however, be used also in connection with mechanical models that can be taken to pieces, as well as in connection with toy-structures imitating, for instances, bridges, frames of various kinds, and the like. The improved joint consists essentially of two or more separate tubular members, or tube-like parts or pieces respectively, having each a flat lug extending in the longitudinal direction thereof, one of these lugs being provided with a hole and the other with a projection adapted to engage that hole and extending oppositely to the tubular part of the respective joint member so that an end of one of the bars to be connected with each other by the joint can be put through the respective tubular part when the joint members are arranged co-axially or at an angle whereby the projection is retained in the hole and the joint-members are connected with each other, as are also the bars to which the joint-members are attached.

My invention is illustrated by way of example in the accompanying drawing in which Fig. 1 is a side-view of one of the joint-members mentioned, the lug of the tubular part being provided with a hole;

Fig. 2 is a plan of the member shown in Fig. 1;

Fig. 3 is an illustration similar to Fig. 1, but the lug is provided with a projection;

Fig. 4 is a sectional plan of the parts shown in Fig. 3;

Fig. 5 shows the joint-members of Figs. 1 and 3, or 2 and 4 respectively, connected with each other;

Fig. 6 is a separate representation of the bar by which the projection of one of the joint-members is checked in the hole of the other joint-member;

Fig. 7 is a cross-section of Fig. 6;

Fig. 8 is a section of a modified form of the joint-member shown in Fig. 1;

Fig. 9 illustrates a further modified form showing the means for checking the bar in the joint-member;

Fig. 10 shows three members of the kind illustrated in Figs. 1 and 3 united with each other in such a manner as to represent one piece;

Fig. 11 shows how a girder is composed with the aid of the joint-members in question; and Figures 12 and 13 show means for adjusting the two joint-members in various angular positions relatively to one another.

Fig. 14 is a section in the direction of the line 14—14 of Fig. 13; the Figures 13 and 14 being in a larger scale.

The improved joint consists of at least two members, of which one is devised according to Figures 1 and 2, and the other according to Figures 3 and 4. The first of them consists of a tubular part $a$ and of a flat extension or lug $b$ provided with a hole $c$. The other member is practically equally devised and consists of a tubular part $a^1$ and a flat lug or extension $b^1$, the only difference being that the extension or lug $b^1$ has a projection $d$, the outer diameter of which corresponds to the diameter of the hole $c$ so that it can be put thereinto.

The joint members may be made of any suitable material, but in the selection thereof the special purpose or object for which the joint is intended should, of course, be considered. In the case of light structures or of toys, the tubular part and the lug may be made integral and may consist, for instance, of an appropriately shaped and bent piece of sheet-metal, the tubular part being slotted throughout its length as shown in the drawing; in the case of heavy structures each joint member may be a cast piece of suitable shape, size, thickness, strength etc. The projection $d$ may, in the case of sheet-metal, be pressed out of the lug so as to be a hollow or tube-like projection and integral therewith, or, if the joint-member is cast, said projection may form an integral part of the cast member.

The two joint-members are connected with each other so as to establish the joint proper (see Fig. 5) by so arranging them relatively to one another that their lugs $b$ and $b^1$ respectively lie opposite to each other, then putting the projection $d$ of the one lug through the hole $c$ of the other lug, and finally, shoving a bar $e$ into the tubular part $b$ of the joint-member provided with the hole $c$ so as to cause said bar to extend rearwardly out of said tubular part and to cover the projection-carrying lug $b^1$ on its rear surface whereby the projection $d$ is retained in the hole $c$ of the first-mentioned lug $b$ and the two joint-members are securely connected with each other.

The bar $e$ may have a tapered end $e^1$ in order to facilitate its introduction into the respective tubular part, and it may also be provided with a flat surface $h$ (Fig. 7) by which rotary motion of the bar and the joint-member or members relatively to one another is prevented. The tubular part may be elastic, f. i. in consequence of it being slotted and press partly into the shoved-in bar so that the arising friction holds the joint-member fast on the bar. Or, a separate spring $k$, Fig. 8, is attached to the joint-member for the just stated purpose whereby the fastening of the latter on the bar is further improved.

Another means for securing the joint-member on the bar in question is illustrated in Figure 9 where a screw $l$ is provided in the tubular part, the screw serving for clamping fast the bar $e$ in the tubular part $a^2$, or $a^1$ respectively.

The joint, practically, is a corner-connection of two bars one of which is shoved in a tubular part $a$ and $a^1$ respectively. It may be disconnected at any time merely by drawing the bars $e$ out of the tubular parts encompassing them. The joint-members may be arranged at any desired angle relatively to each other, and more than two joint-members may be connected with each other at angles of any desired degree in order to form a corner-connection or the like. In the example shown in Figure 10 three joint-members are connected with each other, and in the example illustrated in Fig. 11 a plurality of joint-members devised according to the invention are connected with each other so as to form a toy-structure being a part of a bridge girder.

Suitable means may be provided to secure the two or more joint-members which have been connected with each other in their respective relative angular position. A particularly simple way is shown in Fig. 12 where the adjacent sides of the lugs are provided with notches $f$ and with projections engaging the notches, and reversely, whereby it is rendered possible to adjust the members to any of a plurality of angles and then secure them in the respective position.

In most of the cases the friction between the two lugs will be sufficient for that purpose arising from the elasticity of the tubular parts pressing the two lugs $b^2$ and $b^3$ against each other.

It is obviously possible to secure the joint-members relatively to each other also in other ways than those above described as examples and each part can be so devised and shaped as is best consistent with the method of manufacture desired or preferred, as well as with the special purpose in view.

I claim:

1. A joint for members of bar-structures comprising, in combination, a joint-member consisting of a tubular part and a flat lug extending forth therefrom in the longitudinal direction thereof and having a hole; another joint-member consisting of a tubular member, a flat lug extending forth therefrom in the longitudinal direction thereof, and a projection located on this lug and being adapted to engage the hole of the other lug; and a bar adapted to be put through the first-mentioned tubular part and to check said projection in said hole, substantially as set forth.

2. A joint for members of bar-structures comprising, in combination, a joint-member consisting of a tubular part and a flat lug extending forth therefrom in the longitudinal direction thereof and having a hole; another joint-member consisting of a tubular member, a flat lug extending forth therefrom in the longitudinal direction thereof, and a projection located on this lug and being adapted to engage the hole of the other lug; and a bar having a tapered end and being adapted to put therewith through the first-mentioned tubular part and to check said projection in said hole, substantially as set forth.

3. A joint for members of bar-structures comprising, in combination, a joint-member consisting of a tubular part and a flat lug extending forth therefrom in the longitudinal direction thereof and having a hole; another joint-member consisting of a tubular member, a flat lug extending forth therefrom in the longitudinal direction thereof, and a projection located on this lug and being adapted to engage the hole of the other lug; and a flattened bar adapted to be put through the first-mentioned tubular part, to check said projection in said hole.

4. A joint for members of bar-structures comprising, in combination, a joint-member consisting of a tubular part and a flat lug extending forth therefrom in the longitudinal direction thereof and having a hole; another joint-member consisting of a tubular member, a flat lug extending forth therefrom in the longitudinal direction thereof, and a projection located on this lug and being adapted to engage the hole of the other lug; a bar adapted to be put through the first-mentioned tubular part and to check said projection, and means to keep the bar and the first-mentioned joint-member in their proper relative position, substantially as set forth.

5. An adjustable joint for the members of bar structures comprising, in combination, a plurality of joint-members consisting each of a tubular part adapted to be engaged by a bar and of a flat lug projecting forth therefrom in the longitudinal direction thereof and having a hole; another joint-member also consisting of a tubular part adapted to be engaged by a bar and a flat lug projecting forth therefrom in the longitudinal direction thereof; a projection on the last-mentioned lug adapted to engage said holes; and bars located in said tubular parts, the bar located in the tubular part having said hole extending rearwardly out of the tubular part over the lug of the other joint member, substantially as described.

In testimony whereof I have affixed my signature.

DR. BERTHOLD BUXBAUM.